(12) United States Patent
Suzuki et al.

(10) Patent No.: US 7,893,652 B2
(45) Date of Patent: Feb. 22, 2011

(54) BATTERY CONTROL APPARATUS, ELECTRIC VEHICLE, AND COMPUTER-READABLE MEDIUM STORING A PROGRAM THAT CAUSES A COMPUTER TO EXECUTE PROCESSING FOR ESTIMATING A STATE OF CHARGE OF A SECONDARY BATTERY

(75) Inventors: Masahiko Suzuki, Hoi-gun (JP); Kouta Togashi, Takatsuki (JP); Yukie Uemura, Toyohashi (JP); Kunio Kanamaru, Okazaki (JP)

(73) Assignee: Panasonic EV Energy Co., Ltd., Kosai-shi (JP)

( * ) Notice: Subject to any disclaimer, the term of this patent is extended or adjusted under 35 U.S.C. 154(b) by 761 days.

(21) Appl. No.: 11/849,215

(22) Filed: Aug. 31, 2007

(65) Prior Publication Data
US 2008/0053715 A1 Mar. 6, 2008

(30) Foreign Application Priority Data
Sep. 5, 2006 (JP) .............................. 2006-240333

(51) Int. Cl.
*H02J 7/00* (2006.01)
*H02J 7/14* (2006.01)
*H01M 10/44* (2006.01)
*H01M 10/46* (2006.01)

(52) U.S. Cl. ...................... 320/104; 320/132; 324/427; 324/429; 324/524

(58) Field of Classification Search .................. 320/104
See application file for complete search history.

(56) References Cited

U.S. PATENT DOCUMENTS 5,624,310 A * 4/1997 Fredriksson et al. ........ 454/121

6,417,668 B1 * 7/2002 Howard et al. .............. 324/426
2002/0014879 A1 * 2/2002 Koike et al. ................. 320/133

(Continued)

FOREIGN PATENT DOCUMENTS

JP 11-174134 A 7/1999

(Continued)

*Primary Examiner*—Edward Tso
*Assistant Examiner*—Arun Williams
(74) *Attorney, Agent, or Firm*—Christensen O'Connor Johnson Kindness PLLC

(57) ABSTRACT

The present invention can speedily and accurately estimate an SOC of a secondary battery immediately after a charge/discharge operation resumes. A determination unit determines whether a dormant period is longer than a predetermined time in response to an initiation of power supply from a secondary battery to a motor generator. The dormant period is equivalent to the duration from a previous stop of power supply to a present initiation of power supply. If the dormant period is longer than the predetermined time, a state-of-charge estimating unit sets an initial SOC based on a peak battery voltage drop $\Delta Vs$ and a peak discharge current Is, wherein the peak battery voltage drop $\Delta Vs$ represents a difference between a battery voltage Vo measured before initiating power supply and a lowest battery voltage Vs measured after initiating power supply and the peak discharge current Is represents a maximum current value measured after initiating power supply. The state-of-charge estimating unit estimates a state of charge of the secondary battery 30 based on the initial SOC as a value effective immediately after initiating power supply.

9 Claims, 9 Drawing Sheets

U.S. PATENT DOCUMENTS

| | | | |
|---|---|---|---|
| 2004/0128086 A1* | 7/2004 | Barsoukov et al. | 702/63 |
| 2004/0178798 A1* | 9/2004 | Kikuchi et al. | 324/426 |
| 2006/0238167 A1* | 10/2006 | Arai et al. | 320/132 |
| 2007/0096743 A1* | 5/2007 | Arai et al. | 324/426 |

FOREIGN PATENT DOCUMENTS

| | | |
|---|---|---|
| JP | 2005-300418 A | 10/2005 |

* cited by examiner

BATTERY CONTROL APPARATUS, ELECTRIC VEHICLE, AND COMPUTER-READABLE MEDIUM STORING A PROGRAM THAT CAUSES A COMPUTER TO EXECUTE PROCESSING FOR ESTIMATING A STATE OF CHARGE OF A SECONDARY BATTERY

PRIORITY INFORMATION

This application claims priority to Japanese Patent Application No. 2006-240333 filed on Sep. 5, 2006, which is incorporated herein by reference in its entirety.

BACKGROUND OF THE INVENTION

1. Field of the Invention

The present invention relates to a battery control apparatus configured to estimate a state of charge of a secondary battery.

2. Description of the Related Art

A conventional technique enables estimating a state of charge (hereinafter, referred to as SOC) of a secondary battery, such as a nickel-metal hydride battery or a lithium-ion battery, and controlling a charge/discharge operation of the secondary battery based on an estimated SOC.

For example, a method discussed in Japanese Laid-Open Patent Application No. 11-174134 estimates an SOC based on a cumulatively measured charge/discharge current value of a secondary battery during a predetermined period of time.

However, immediately after starting a charge/discharge operation of a secondary battery, an estimated SOC based on a cumulative charge/discharge current value of the secondary battery is inaccurate because only a short period of time is available for measuring the charge/discharge current.

Another conventional method stores an initial value (hereinafter, referred to as "previous SOC") that represents an SOC value immediately before a previous charge/discharge operation of a secondary battery is completed and, if the charge/discharge operation of the secondary battery resumes, estimates an SOC value based on the initial value (i.e., previous SOC).

Furthermore, a method discussed in Japanese Laid-Open Patent Application No. 2005-300418 detects a maximum voltage drop in a residual capacity of a lead-acid battery during a startup operation of a vehicle and estimates an SOC of the lead-acid battery with reference to a relationship between the maximum voltage drop and a current value corresponding to the voltage drop.

In general, the SOC of a secondary battery tends to decrease due to a self discharge that may occur when the secondary battery does not perform a charge/discharge operation. Therefore, if the secondary battery is left for a long time after a previous operation, an SOC level at which the secondary battery resumes its operation may be different from a previous SOC level. In other words, an SOC estimated from the previous SOC may not be directly used as an initial value for estimating the SOC at the time the secondary battery resumes its operation.

Furthermore, in a charge/discharge operation of a secondary battery, a polarization voltage (more specifically, electrochemical polarization voltage) may be generated due to an electromotive force of the battery although Japanese Laid-Open Patent Application No. 2005-300418 does not mention any adverse effect of the polarization voltage. Therefore, the SOC estimating method discussed in Japanese Laid-Open Patent Application No. 2005-300418 may not accurately estimate the SOC if a polarization voltage is generated.

SUMMARY OF THE INVENTION

The present invention is directed to a technique capable of accurately estimating an SOC of a secondary battery in a short period of time immediately after a charge/discharge operation resumes.

According to an aspect of the present invention, a battery control apparatus includes a determination unit configured to determine whether a secondary battery generates a polarization voltage in response to an initiation of power supply from the secondary battery to a load; and a state-of-charge estimating unit configured to estimate a present state of charge indicating a state of charge of the secondary battery immediately after initiating power supply, if the determination unit determines that the secondary battery generates no polarization voltage. The state-of-charge estimating unit calculates the present state of charge based on a peak battery voltage drop $\Delta Vs$ and a peak discharge current Is, wherein the peak battery voltage drop $\Delta Vs$ represents a difference between a battery voltage Vo measured before initiating power supply and a lowest battery voltage Vs measured after initiating power supply. The peak discharge current Is represents a maximum current value measured after initiating power supply. The state-of-charge estimating unit sets an initial value based on the estimated present state of charge and estimates a state of charge of the secondary battery based on the initial value as a value effective immediately after initiating power supply.

In the battery control apparatus according to the present invention, it is preferable that the determination unit determines that the secondary battery generates no polarization voltage if a dormant period is longer than a predetermined time and determines that the secondary battery generates a polarization voltage if the dormant period is shorter than or equal to the predetermined time, wherein the dormant period is equivalent to the duration from a previous stop of the power supply to a present initiation of power supply.

In the battery control apparatus according to the present invention, it is preferable that the state-of-charge estimating unit sets the initial value based on a previous state of charge estimated immediately before a previous stop of the power supply, if the determination unit determines that the secondary battery generates a polarization voltage.

Preferably, the battery control apparatus according to the present invention further includes a control unit configured to prevent the state-of-charge estimating unit from estimating the present state of charge and prohibit initiating the power supply, if the determination unit determines that the secondary battery generates a polarization voltage.

In the battery control apparatus according to the present invention, it is preferable that the state-of-charge estimating unit determines whether the present state of charge is higher than a previous state of charge estimated immediately before a previous stop of the power supply, and sets the initial value based on the previous state of charge instead of using the present state of charge.

Preferably, the battery control apparatus according to the present invention further includes a control unit configured to execute predetermined anti-overdischarge processing for the secondary battery if the present state of charge is less than a predetermined value.

In the battery control apparatus according to the present invention, it is preferable that the state-of-charge estimating unit estimates the present state of charge based on a battery temperature of the secondary battery in addition to the peak battery voltage drop ΔVs and the peak discharge current Is.

According to another aspect of the present invention, a computer-readable medium stores a program for causing a computer to perform processing for estimating a state of charge of a secondary battery. The processing includes determining whether the secondary battery generates a polarization voltage in response to an initiation of power supply from the secondary battery to a load; estimating a present state of charge indicating a state of charge of the secondary battery immediately after initiating power supply, if it is determined that the secondary battery generates no polarization voltage, based on a peak battery voltage drop ΔVs and a peak discharge current Is, wherein the peak battery voltage drop ΔVs represents a difference between a battery voltage Vo measured before initiating power supply and a lowest battery voltage Vs measured after initiating power supply and the peak discharge current Is represents a maximum current value measured after initiating power supply; setting an initial value based on the estimated present state of charge; and estimating a state of charge of the secondary battery based on the initial value as a value effective immediately after initiating power supply.

According to yet another aspect of the present invention, an electric vehicle includes a motor generator configured to generate a driving power; a secondary battery configured to supply electric power to the motor generator; a determination unit configured to determine whether a dormant period is longer than a predetermined time when the secondary battery initiates power supply to the motor generator in response to a turning-on operation of an ignition switch, wherein the dormant period is equivalent to the duration from a previous stop of the power supply to a present initiation of power supply; and a state-of-charge estimating unit configured to estimate a present state of charge indicating a state of charge of the secondary battery immediately after initiating power supply, if the determination unit determines that the dormant period is longer than a predetermined time. The state-of-charge estimating unit calculates the present state of charge based on a peak battery voltage drop ΔVs and a peak discharge current Is, wherein the peak battery voltage drop ΔVs represents a difference between a battery voltage Vo measured before initiating power supply and a lowest battery voltage Vs measured after initiating power supply. The peak discharge current Is represents a maximum current value measured after initiating power supply. The state-of-charge estimating unit sets an initial value based on the estimated present state of charge and estimates a state of charge of the secondary battery based on the initial value as a value effective immediately after initiating power supply.

According to the present invention, the effect of a polarization voltage appearing in a secondary battery is taken into consideration. For example, if a discharge dormant period of the secondary battery is longer than a predetermined time ta, it is determined that the polarization voltage has less effect. If the polarization voltage has less effect, the present invention estimates a state of charge of the secondary battery based on the peak battery voltage drop ΔVs and the peak discharge current Is, immediately after initiating a discharge operation of the secondary battery, and sets an initial value based on the estimated state of charge. Setting an initial value in this manner is effective to speedily and accurately estimate a state of charge in a short period of time.

BRIEF DESCRIPTION OF THE DRAWINGS

The accompanying drawings, which are incorporated in and constitute a part of the specification, illustrate an embodiment of the invention and, together with the description, serve to explain the principles of the invention, in which:

FIG. 3 illustrates temporal changes of the discharge current and the battery voltage after an ignition switch is turned on;

DESCRIPTION OF PREFERRED EMBODIMENTS

Exemplary embodiments of the present invention based on a hybrid electric vehicle will now be described below with reference to the drawings. In the present embodiment, a hybrid electric vehicle is an example of the electric vehicle. Embodiments of the present invention are not limited to a hybrid electric vehicle and can be applied to any other electric vehicle which includes a motor generator as a driving power source.

Figure 1:
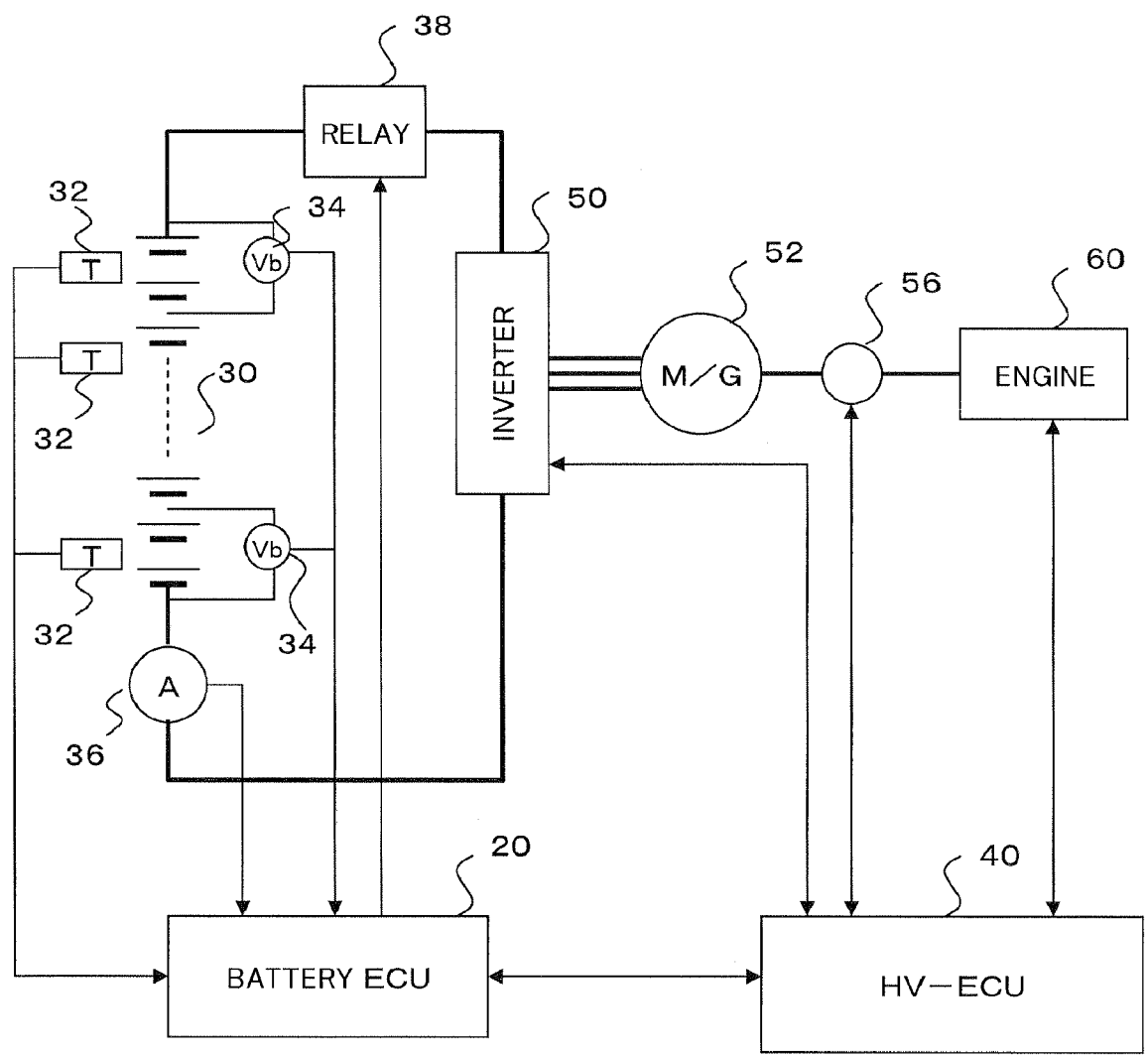
FIG. 1 illustrates a hybrid electric vehicle according to an embodiment or each modified embodiment.

FIG. 1 illustrates a hybrid electric vehicle according to the present embodiment.

In FIG. 1, a battery electronic control unit (hereinafter, referred to as "battery ECU") 20 receives various operational information (battery voltage, battery temperature, etc) from a secondary battery 30, estimates an SOC of the secondary battery 30, and transmits an estimated SOC together with other battery information (battery voltage, battery temperature, etc) to a hybrid electronic control unit (hereinafter, referred to as "HV-ECU") 40. The HV-ECU 40 controls an inverter 50, a driving power distribution device 56, and an engine (internal combustion engine) 60.

The secondary battery 30 includes a plurality of battery blocks which are serially connected. Each battery block includes two battery modules which are serially connected. Each battery module includes a total of six cells which are serially connected. The numbers of battery blocks, battery modules, and cells are not limited to specific values. The structural arrangement of the secondary battery is not limited to the example illustrated in FIG. 1. The secondary battery 30 is, for example, a nickel-metal hydride battery or a lithium-ion battery.

The secondary battery 30 is connected to a motor generator (M/G) 52 via a relay 38 and the inverter 50. The motor generator 52 is connected to the engine 60 via the driving power distribution device 56 including a planetary gear mechanism.

At least one temperature sensor 32 detects (measures) a battery temperature T of the secondary battery 30. The temperature sensor 32 can be provided in each group composed of plural battery blocks if the temperatures of these blocks are not significantly different. Alternatively, the temperature sensor 32 may be provided in each battery block having a relatively large temperature difference. The grouping of battery blocks or selection of a detection object can be determined with reference to experimentally measured temperatures of respective battery blocks.

A voltage sensor 34, provided in each battery block, detects a terminal voltage Vb of each battery block. Furthermore, a current sensor 36 detects a charge/discharge current I of the secondary battery 30.

The battery ECU 20 receives temperature information from the temperature sensor 32, battery voltage information from the voltage sensor 34, and charge/discharge current information from the current sensor 36. The battery ECU 20 estimates an SOC of the secondary battery 30 based on the information input from these sensors.

Figure 2:
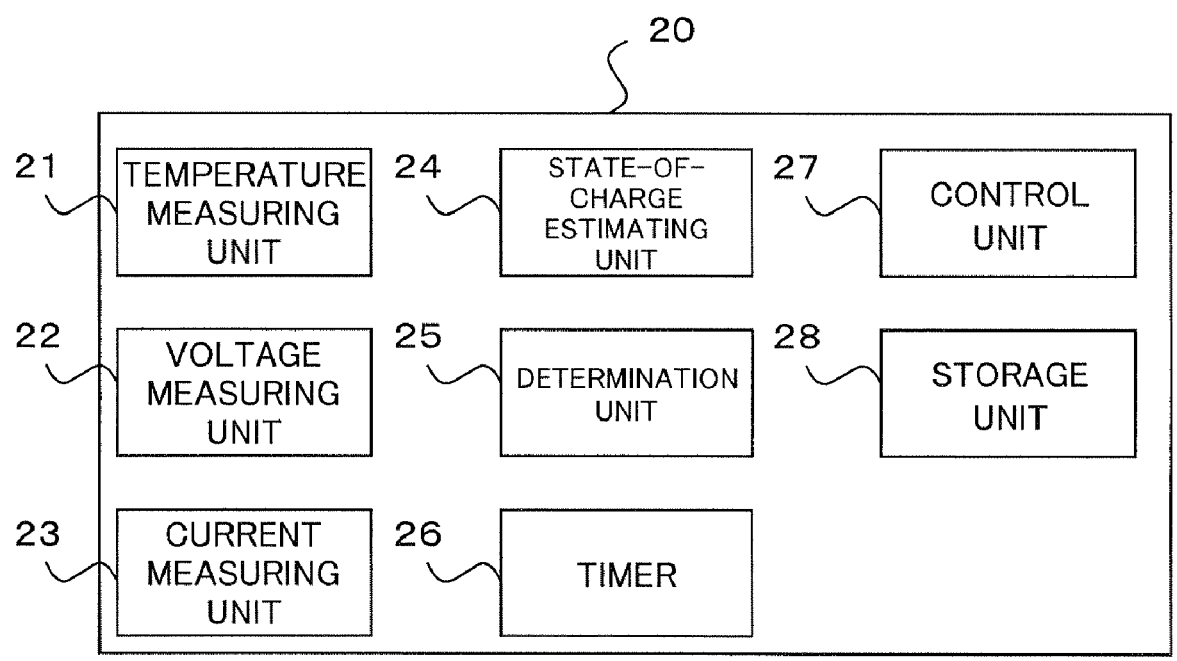
FIG. 2 is a block diagram illustrating a functional configuration of a battery ECU 20 according to an embodiment or each modified embodiment.

FIG. 2 is a block diagram illustrating a functional configuration of the battery ECU 20 according to the present embodiment.

The battery ECU 20 includes a temperature measuring unit 21, a voltage measuring unit 22, a current measuring unit 23, a state-of-charge estimating unit 24, a determination unit 25, a timer 26, a control unit 27, and a storage unit 28, which respectively operate as internal functional blocks.

The temperature measuring unit 21 measures a battery temperature of the secondary battery 30. In the present embodiment, the temperature sensor 32 is a common sensor provided in each group. The temperature measuring unit 21 converts an analog output signal of the temperature sensor 32 into a digital signal and generates temperature data that can identify a battery temperature of each group. The temperature measuring unit 21 sends the temperature data to the control unit 27 at predetermined intervals equivalent to 100 ms. The storage unit 28 receives the temperature data via the control unit 27 and stores the temperature data. The control unit 27, for example, obtains the battery temperature T as a representative value (e.g., average value) indicating the battery temperature of a group identified by the temperature data stored in the storage unit 28.

The voltage measuring unit 22 measures a terminal voltage of the secondary battery 30. In the present embodiment, the voltage measuring unit 22 measures the terminal voltage Vb of each battery block. The voltage measuring unit 22 generates voltage data identifying the terminal voltage Vb and sends the voltage data to the control unit 27 at predetermined intervals equivalent to 100 ms. The storage unit 28 receives the voltage data via the control unit 27 and stores the voltage data.

The current measuring unit 23 measures the charge/discharge current I in a charge/discharge operation of the secondary battery 30. In the present embodiment, the current measuring unit 23 converts an analog output signal of the current sensor 36 into a digital signal. The current measuring unit 23 generates current data identifying the input current of the secondary battery 30 in a charge operation and the output current of the secondary battery 30 in a discharge operation based on the digital signal. The current measuring unit 23 outputs the generated current data to the control unit 27. The current measuring unit 23, for example, generates negative current data in a charge operation and positive current data in a discharge operation. The current measuring unit 23 sends the current data to the control unit 27 at predetermined time intervals (e.g., 100 ms). The control unit 27 stores the current data into the storage unit 28.

The storage unit 28, as described above, stores the temperature data, the voltage data, and the current data. The storage unit 28 stores a previous SOC which represents an SOC of the secondary battery 30 estimated by the state-of-charge estimating unit 24, immediately before the engine stops in response to a turning-off operation of a key switch.

In an ordinary state after the engine starts, the state-of-charge estimating unit 24 estimates an SOC of the secondary battery 30 based on the battery voltage Vb, the charge/discharge current I, and the battery temperature T. In the present embodiment, the state-of-charge estimating unit 24 obtains plural sets of pair data of the battery voltage Vb and the charge/discharge current I for each battery block, for example, during a predetermined period of time (e.g., 60 sec) and stores the obtained data.

The state-of-charge estimating unit 24 obtains a 1st-order approximate line (approximate line of voltage V-current I) from the pair data according to a regression analysis. Then, the state-of-charge estimating unit 24 obtains a V-intercept of the V-I approximate line as a battery voltage V0 (no-load voltage). Furthermore, the state-of-charge estimating unit 24 calculates an integrated current value ∫I and obtains a polarization voltage Vp of the battery from a function equation involving the parameters of the battery temperature T, the battery voltage V0, and the integrated current value ∫I. Furthermore, the state-of-charge estimating unit 24 subtracts the polarization voltage Vp from the battery voltage V0 and obtains an electromotive force E of the battery. Next, the state-of-charge estimating unit 24 estimates an SOC of each battery block based on the obtained electromotive force E with reference to electromotive force-SOC characteristics which can be prepared beforehand. In the present embodiment, the SOC of the secondary battery 30 is a representative SOC value of each battery block (e.g., average SOC value).

In general, immediately after an engine startup operation, an initial value used by the state-of-charge estimating unit 24 that estimates the SOC is the previous SOC stored in the storage unit 28. However, the previous SOC may differ greatly from an actual SOC because of a self discharge occurring during a dormant period of the secondary battery 30. If a charge/discharge operation of the secondary battery 30 is performed based on the initial value (i.e., previous SOC) including a significant error, the secondary battery 30 may not be free from overdischarge or other adverse effects.

In view of the foregoing, in the present embodiment, the state-of-charge estimating unit 24 obtains an SOC of the secondary battery 30 immediately after activating the motor generator 52, based on a peak discharge current Is and a peak battery voltage drop ΔVs appearing immediately after the activation of the motor generator 52 as well as the battery temperature T. The obtained SOC is set as an initial value.

Figure 3:
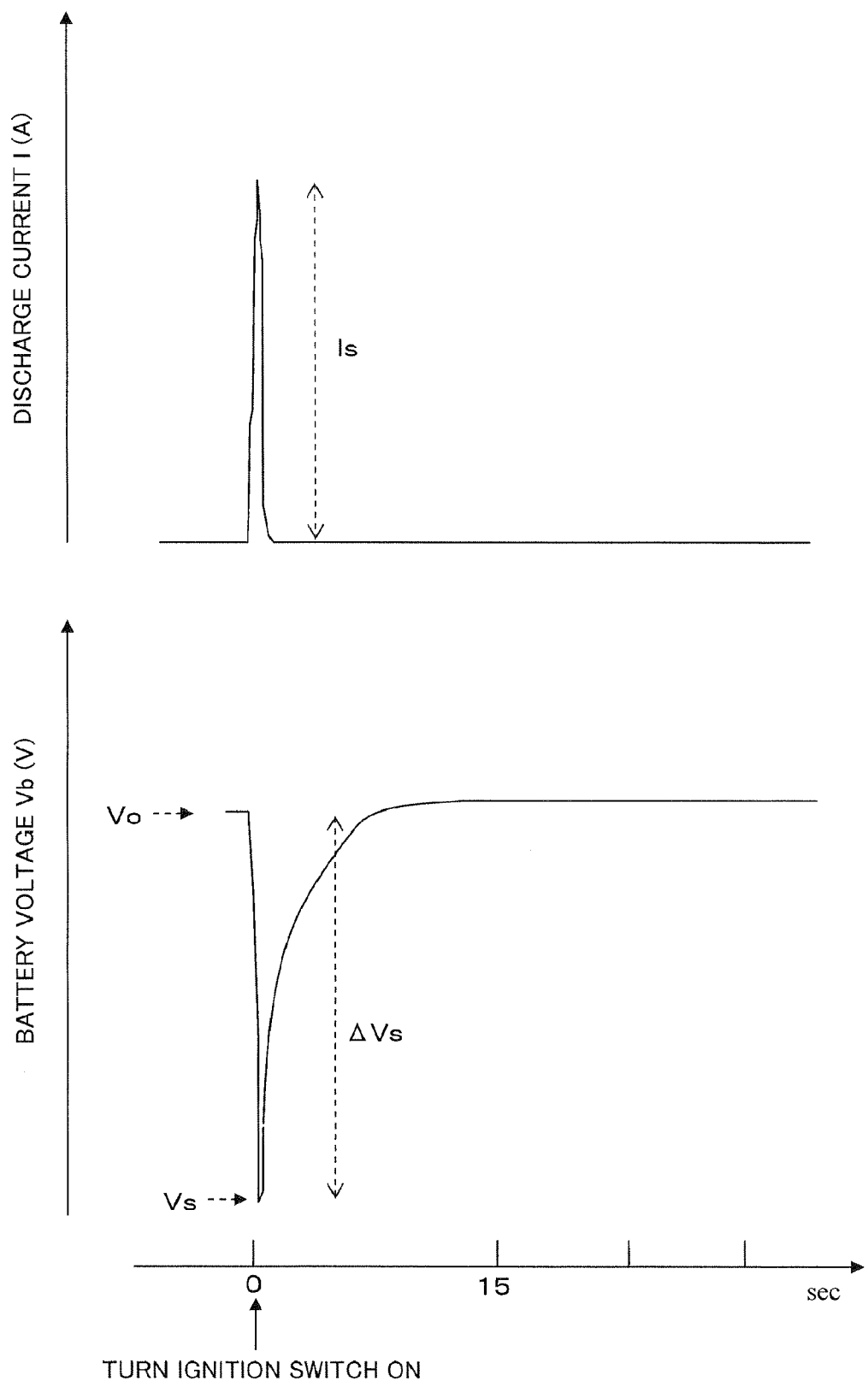

FIG. 3 illustrates temporal changes of the discharge current and the battery voltage after an ignition switch is turned on. In FIG. 3, the peak discharge current Is represents a maximum current value appearing within a predetermined time tb after initiating power supply from the secondary battery 30 to the motor generator 52 in response to a turning-on operation of the ignition switch. The peak battery voltage drop ΔVs represents a difference between a battery voltage Vo measured immediately before initiating power supply from the secondary battery 30 to the motor generator 52 and a lowest battery voltage Vs appearing within the predetermined time tb after initiating power supply from the secondary battery 30 to the motor generator 52. Namely, the following formula defines the peak battery voltage drop ΔVs.

$$\Delta Vs = Vo - Vs \qquad (1)$$

In the present embodiment, the battery voltage Vo measured immediately before initiating power supply and the lowest battery voltage Vs appearing within predetermined time tb are representative battery voltage values (e.g., average values) of respective battery blocks.

Figure 4A:
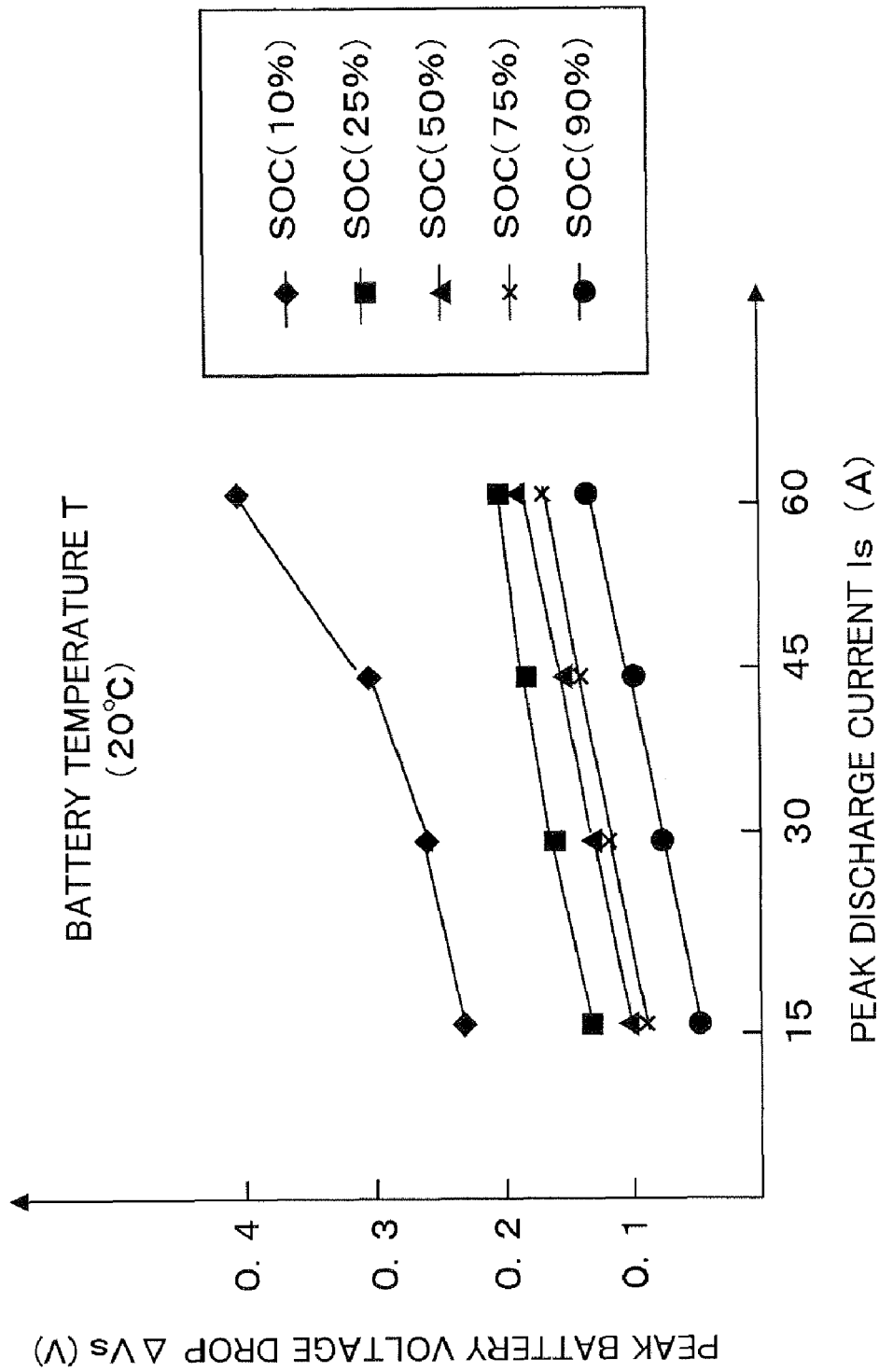
FIG. 4A is an exemplary map illustrating a relationship between the peak battery voltage drop ΔVs and the peak discharge current Is for representative SOC values, used when the battery ECU estimates a present SOC.

FIG. 4A is an SOC estimating map illustrating a relationship between the peak battery voltage drop ΔVs and the peak discharge current Is for representative SOC values measured when the battery temperature T is 20° C. Namely, by referring to such an SOC estimating map, the apparatus can estimate an SOC based on the peak battery voltage drop ΔVs and the peak discharge current Is.

The following is the reason why the present embodiment calculates a difference from the battery voltage Vo measured immediately before initiating power supply to obtain a voltage drop appearing immediately after initiating power supply from the secondary battery 30 to the motor generator 52.

In general, a lead-acid battery for an alternator system operates at a full-charge (100%) level. On the other hand, the secondary battery for a hybrid vehicle (e.g., a nickel-metal hydride battery or a lithium-ion battery) has an operating voltage variable in an intermediate range of 20%-80% SOC. If the SOC is not constant, the battery voltage Vo measured immediately before initiating power supply is not constant and is in a so-called open-state. Therefore, accurately measuring the battery voltage drop is difficult if obtainable data is only the battery voltage measured immediately after initiating a charge/discharge operation of the secondary battery. Hence, the present embodiment obtains the peak battery voltage drop ΔVs based on a difference between the battery voltage Vo and the battery voltage Vs.

Figure 4B:
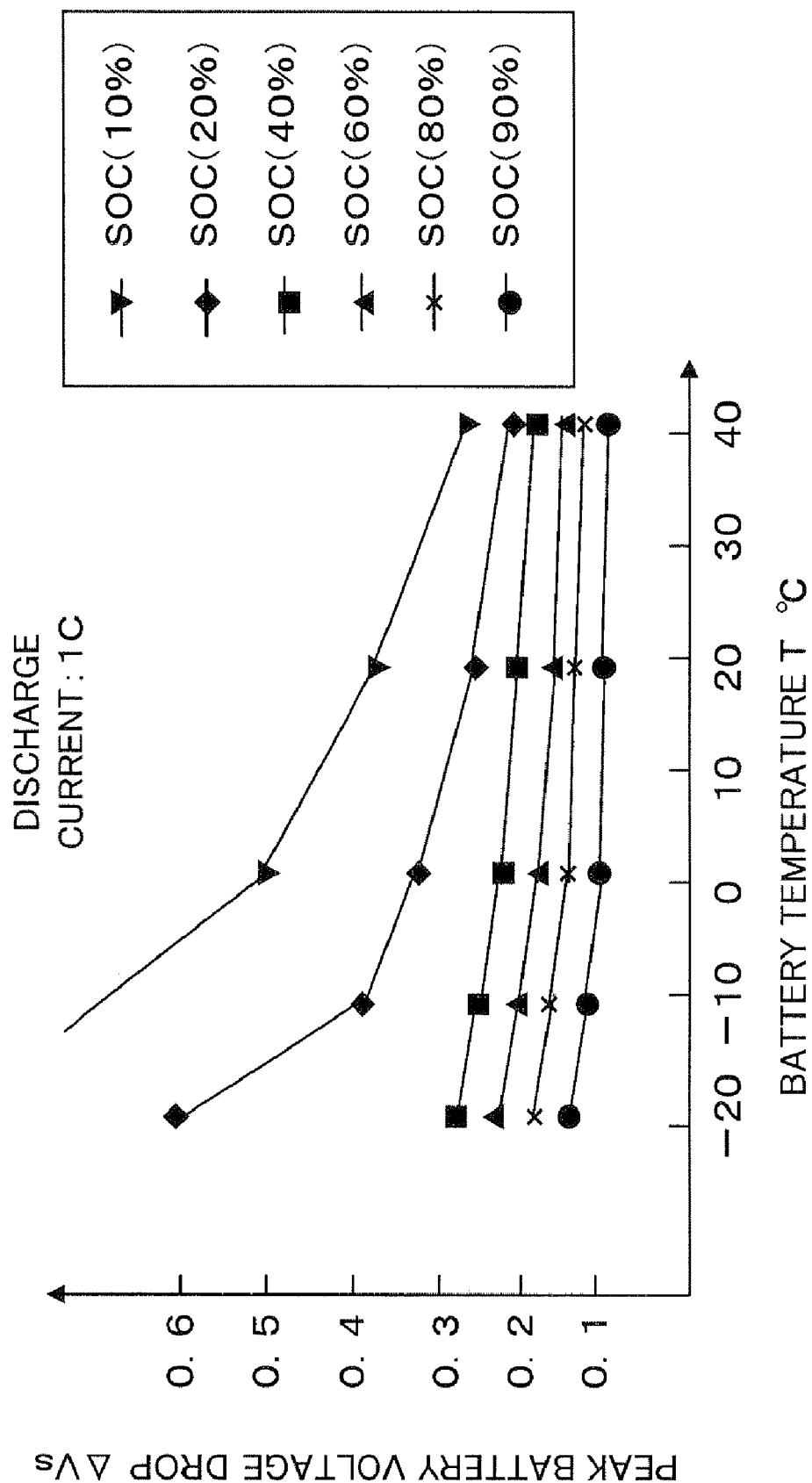
FIG. 4B is an exemplary map illustrating a relationship between the peak battery voltage drop ΔVs and battery temperature T for representative SOC values.

FIG. 4B is a map illustrating a relationship between the peak battery voltage drop ΔVs and the battery temperature T for representative SOC values measured when the peak discharge current Is is 1C. As will be apparent from FIG. 4B, the battery temperature T is a decisive factor in determining a relationship between the peak battery voltage drop ΔVs and the SOC. Especially, if the battery temperature T is not higher than 0° C., the peak battery voltage drop ΔVs increases exponentially due to an internal resistance of the secondary battery 30 that increases abruptly when the SOC is less than 20%. The peak battery voltage drop ΔVs is small when the SOC is higher than 80%.

As described above, the secondary battery for a hybrid vehicle operates in an intermediate range of 20%-80% SOC. Therefore, an accurate detection of the SOC can be realized when a parameter relating to the battery temperature T is taken into consideration in addition to the peak battery voltage drop ΔVs and the peak discharge current Is.

In the present embodiment, the storage unit 28 stores a map of voltage data similar to the map illustrated in FIG. 4A, which can be experimentally obtained as data of specific battery temperatures. The state-of-charge estimating unit 24 identifies an SOC obtainable from the peak discharge current Is and the peak battery voltage drop ΔVs with reference to the map data corresponding to a measured battery temperature T. Thus, the state-of-charge estimating unit 24 can obtain a present SOC that indicates an SOC of the secondary battery 30 immediately after initiating power supply to the motor generator 52. The present SOC is set as an initial value.

When a discharge operation of the secondary battery 30 stops and the discharge current decreases to zero, the polarization voltage does not immediately decrease to zero as illustrated in FIG. 3. Therefore, due to an effect of the polarization voltage, there is a delay time before the battery voltage Vb of the secondary battery 30 returns to the battery voltage Vo. If any polarization voltage is present, the battery voltage Vb of the secondary battery 30 includes a voltage drop due to the effect of the polarization voltage. Therefore, the above-described procedure cannot accurately obtain the peak battery voltage drop ΔVs.

In the present embodiment, the determination unit 25 refers to a discharge dormant period of the secondary battery 30 in determining whether the secondary battery 30 generates a polarization voltage. More specifically, if the dormant period is longer than a predetermined time ta, the determination unit 25 determines that the secondary battery 30 generates no polarization voltage. If the dormant period is shorter than the predetermined time ta, the determination unit 25 determines that the secondary battery 30 generates a polarization voltage.

If the determination unit 25 determines that the charge/discharge dormant period of the secondary battery 30 is longer than the predetermined time ta, the state-of-charge estimating unit 24 obtains the present SOC as described above and sets the obtained present SOC as an initial value. On the other hand, if the dormant period is shorter than the predetermined time ta, the state-of-charge estimating unit 24 determines that an inaccurate SOC may be obtained from the present SOC. Therefore, the state-of-charge estimating unit 24 uses the previous SOC as an initial value.

The determination unit 25 causes the timer 26 to start counting when a discharge operation of the secondary battery 30 is stopped, for example, in response to a turning-off operation of the ignition switch. Then, with reference to a count value of the timer 26, the determination unit 25 identifies a dormant period during which a discharge operation of the secondary battery 30 is disabled, at the time the secondary battery 30 again initiates power supply to the motor generator 52 in response to a turning-on operation of the ignition switch. The predetermined time ta is, for example, 15 sec which can be experimentally obtained by measuring a period of time from generation to extinction of a polarization voltage in the secondary battery 30.

Furthermore, the battery ECU 20 causes the timer 26 to continue counting until the ignition switch turns on again and stops the timer 26 if the timer count exceeds the predetermined time ta. In this case, the determination unit 25 determines whether the timer 26 is currently operating. If the timer 26 is operating, the determination unit 25 can determine that the dormant period is shorter than the predetermined time ta.

As described above, the present embodiment measures a dormant period to identify any presence of a polarization voltage. However, the determination unit 25 can use another method capable of determining a generation of the polarization voltage. For example, after the secondary battery 30 stops power supply to the motor generator 52, the determination unit 25 successively detects the battery voltage Vb during a predetermined period of time and calculates a change rate of the battery voltage Vb based on plural detection values of the battery voltage Vb. If the change rate is small, the determination unit 25 can determine that the effect of the polarization voltage does not substantially remain (i.e., no polarization voltage is generated).

Figure 5:
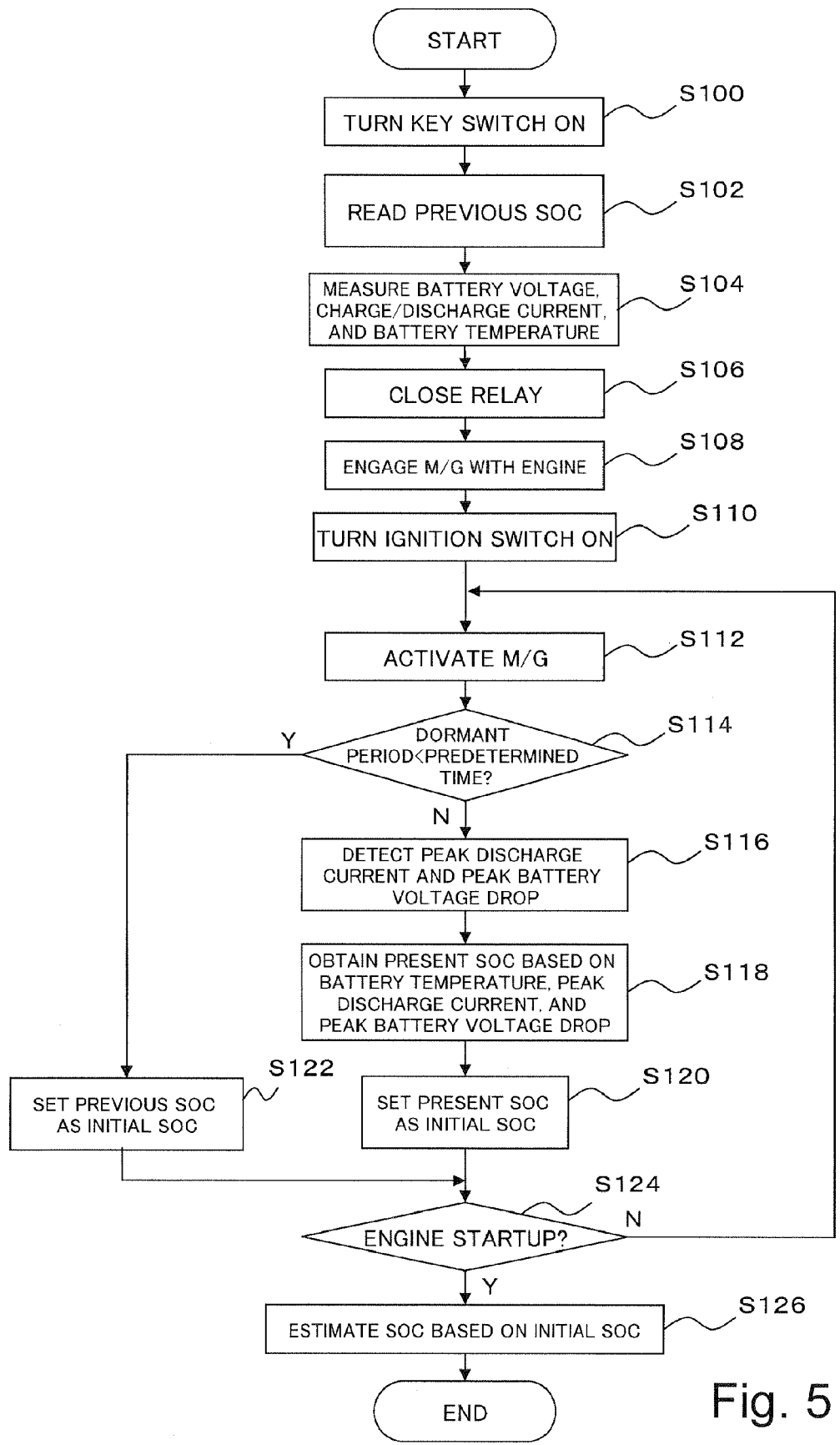
FIG. 5 is a flowchart illustrating a processing procedure for the battery ECU 20 and the HV-ECU 40 in an engine startup operation according to an embodiment.

FIG. 5 is a flowchart illustrating a processing procedure for the battery ECU 20 and the HV-ECU 40 in an engine startup operation. The procedure of FIG. 5 is exemplary processing for obtaining an initial SOC.

In step S100, a user inserts a key into a key cylinder to turn a key switch on. In step S102, the battery ECU 20 reads a previous SOC from the storage unit 28. In step S104, the battery ECU 20 starts measuring the battery voltage Vb, the charge/discharge current I, and the battery temperature T. In step S106, the battery ECU 20 closes the relay 38 to electrically connect the secondary battery 30 and the inverter 50. In step S108, the HV-ECU 40 causes the driving power distribution device 56 to transmit a driving force of the motor generator 52 to the engine 60.

Then, in step S110, the user turns an ignition switch on by turning the key. In step S112, the HV-ECU 40 controls the inverter 50 to supply electric power from the secondary battery 30 to the motor generator 52 via the inverter 50. The motor generator 52, when activated by electric power supplied from the secondary battery 30, starts an engine startup operation.

In step S114, the battery ECU 20 determines whether the dormant period of the secondary battery 30 is shorter than the predetermined time ta. In other words, the battery ECU 20 determines whether the secondary battery 30 generates a polarization voltage according to a determination result in step S114. If the dormant period is longer than the predetermined time ta (NO in step S114), the battery ECU 20 determines that the secondary battery 30 generates no polarization voltage. In step S116, the battery ECU 20 detects both the peak discharge current Is and the peak battery voltage drop ΔVs which appear immediately after the motor generator 52 starts an operation.

In step S118, the battery ECU 20 obtains a present SOC of the secondary battery 30 corresponding to the battery temperature T with reference to the map data and identifies an SOC corresponding to the detected peak discharge current Is and the peak battery voltage drop ΔVs. In step S120, the battery ECU 20 sets the present SOC as an initial SOC. Namely, the initial SOC set by the battery ECU 20 is a present SOC estimated based on the battery temperature T, the peak discharge current Is, and the peak battery voltage drop ΔVs. Thus, the battery ECU 20 discards the previous SOC having been stored in response to a previous turning-off operation of the key switch.

If the charge/discharge dormant period of the secondary battery 30 is shorter than the predetermined time ta (YES in step S114), the processing flow proceeds to step S122. In step S122, the battery ECU 20 sets the previous SOC as an initial SOC.

In step S124, the battery ECU 20 determines whether an engine startup operation has been successful completed after the activation of the motor generator 52 in step S112. If the engine startup operation is successful (YES in step S124), the battery ECU 20 estimates an SOC based on the integrated charge/discharge current I with reference to the initial SOC. In step S126, the battery ECU 20 performs a charge/discharge operation of the secondary battery 20 based on the estimated SOC.

If the engine startup operation has failed (NO in step S124), the processing flow returns to step S112. The battery ECU 20 repeats the above-described processing. The HV-ECU 40, for example, determines that the engine startup operation has failed if an engine speed (i.e., a rotational speed of an output shaft of the engine) is lower than a predetermined level and if a change in the rotation exceeds a predetermined value. If the battery ECU 20 first performs the determination of step S114 after an engine startup operation has failed, the battery ECU 20 obtains a charge/discharge dormant period of the secondary battery 30 that is equal to the duration from a previous stop of power supply from the secondary battery 30 to the motor generator 52 to a present initiation of power supply to the motor generator 52. The battery ECU 20 determines whether the charge/discharge dormant period of the secondary battery 30 is shorter than or equal to predetermined time ta.

As apparent from the foregoing description, the present embodiment considers the effect of the polarization voltage occurring in the secondary battery 30. If the discharge dormant period of the secondary battery 30 is longer than the predetermined time ta, the battery ECU 20 obtains an SOC of the secondary battery 30 in the engine startup operation (i.e., initial SOC) based on the battery temperature T, the peak discharge current Is, and the peak battery voltage drop ΔVs, with reference to the map data illustrated in FIG. 4A. Thus, the present embodiment can speedily and accurately estimate the initial SOC in a short period of time.

The following is a first modified embodiment of the present embodiment.

Figure 6:
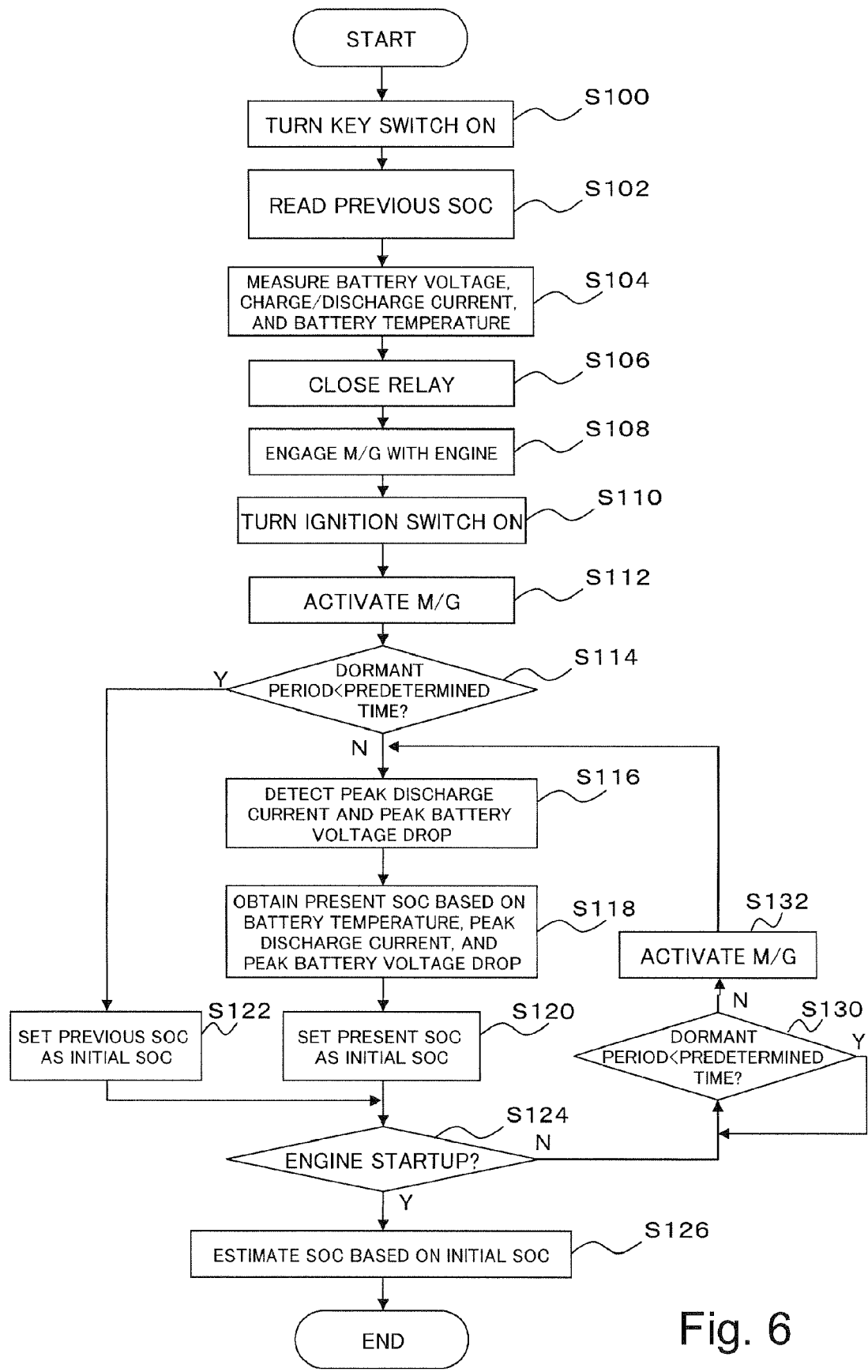
FIG. 6 is a flowchart illustrating a processing procedure for the battery ECU 20 and the HV-ECU 40 in an engine startup operation according to a first modified embodiment.

FIG. 6 is a flowchart illustrating a processing procedure for the battery ECU 20 and the HV-ECU 40 in an engine startup operation according to the first modified embodiment.

As illustrated in FIG. 6, according to the first modified embodiment, if the engine startup operation has failed (NO in step S124), the processing flow proceeds to step S130. In step 130, the battery ECU 20 determines whether the charge/discharge dormant period of the secondary battery 30 is shorter than the predetermined time ta. If the charge/discharge dormant period is shorter than the predetermined time ta (YES in step S130), the battery ECU 20 prohibits the motor generator 52 from operating. If the dormant period is equal to or longer than the predetermined time ta (NO in step S130), the processing flow proceeds to step S132. In step S132, the battery ECU 20 activates the motor generator 52 again.

As described above, if an engine startup operation has failed, the first modified embodiment prohibits the motor generator 52 from starting an operation until the charge/discharge dormant period of the secondary battery 30 exceeds the predetermined time ta. Thus, the first modified embodiment cancels or postpones estimating the SOC if any polarization voltage is generated in the secondary battery 30. Therefore, the first modified embodiment can maintain the accuracy for estimating the SOC.

The following is a second modified embodiment of the present embodiment.

The above-described embodiments may inaccurately estimate the SOC if there are any measurement errors in the detection of the discharge current and the battery voltage, even if a polarization voltage of the secondary battery 30 is taken into consideration in the estimation of the present SOC.

In view of the foregoing, the second modified embodiment is configured to evaluate the present SOC when the present SOC is obtained.

Figure 7:
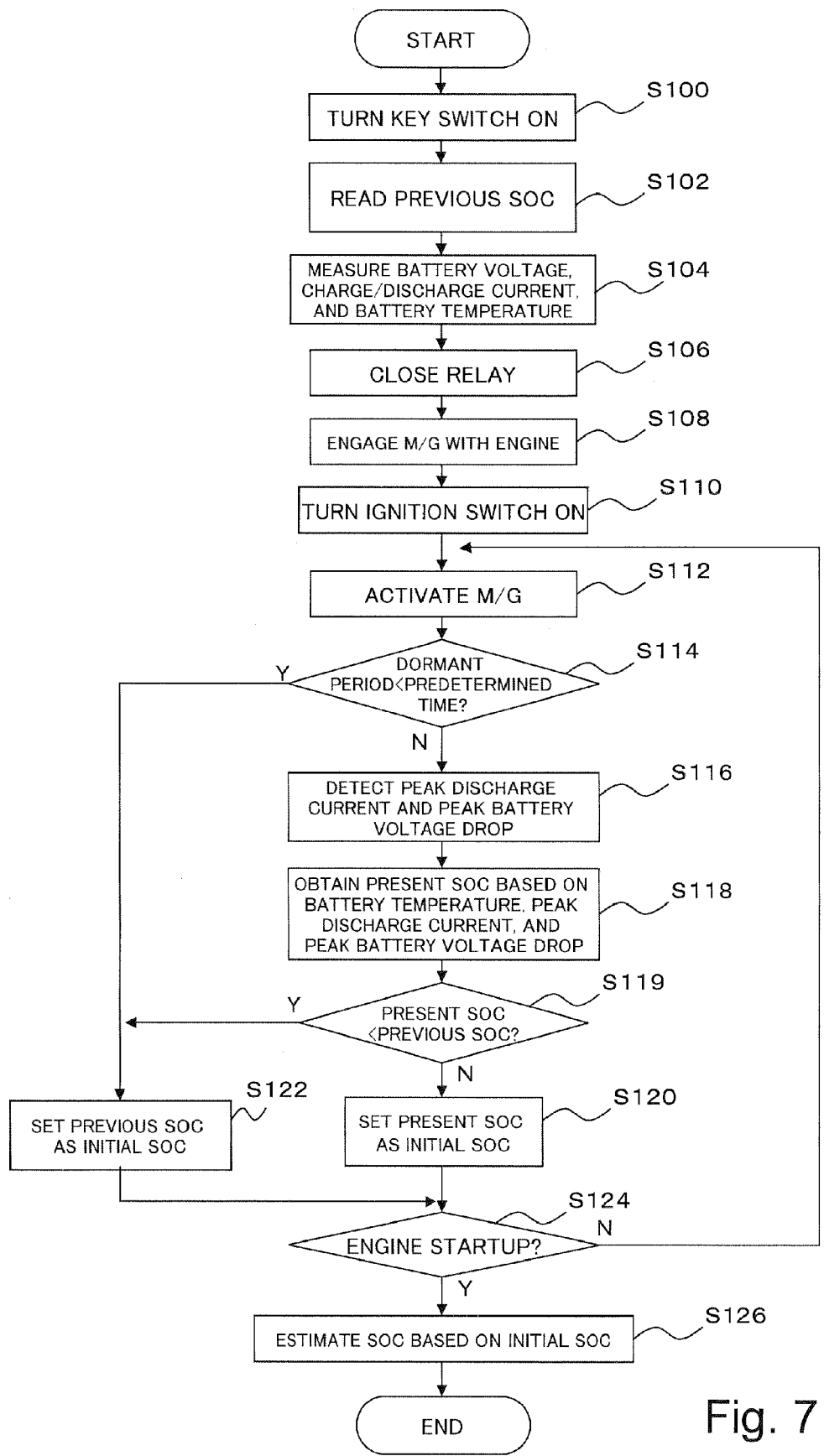
FIG. 7 is a flowchart illustrating a processing procedure for the battery ECU 20 and the HV-ECU 40 in an engine startup operation according to a second modified embodiment.

FIG. 7 is a flowchart illustrating a processing procedure for the battery ECU 20 and the HV-ECU 40 in an engine startup operation according to a second modified embodiment.

As illustrated in FIG. 7, the second modified embodiment includes step S118 of obtaining a present SOC based on the battery temperature T, the peak discharge current Is, and the peak battery voltage drop ΔVs. Then, in step S119, the battery ECU 20 determines whether the present SOC is higher than the previous SOC. If the present SOC is higher than the previous SOC (YES in step S119), the battery ECU 20 determines that the present SOC is inaccurate and the processing flow proceeds to step S122. In step S122, the battery ECU 20 sets the previous SOC as an initial SOC and discards the present SOC.

The SOC may have a lower value when the secondary battery 30 resumes the charge/discharge operation if a self discharge occurs in the secondary battery 30 after termination of a previous charge/discharge. Therefore, as described above, if the present SOC is higher than the previous SOC, an inaccurate present SOC will be obtained. In such a case, if the present SOC is set as an initial value to perform a charge/discharge operation of the secondary battery 30, an initial SOC becomes higher than the actual SOC. Therefore, the secondary battery 30 will suffer from an overdischarge phenomenon. Hence, if the present SOC is higher than the previous SOC, the battery ECU 20 sets the previous SOC as an initial SOC. Thus, the second modified embodiment can prevent the secondary battery 30 from overdischarging even if an estimated SOC is inaccurate due to measurement errors in the detection of the discharge current and the battery voltage.

The following is a third modified embodiment of the present embodiment.

If the secondary battery 30 is left for a long time, the secondary battery 30 causes a self discharge and an SOC may be significantly lower than the previous SOC when a charge/discharge of the secondary battery 30 resumes. In such a case, an overdischarge phenomenon may appear immediately after the charge/discharge operation of the secondary battery 30 resumes. Hence, the third modified embodiment executes predetermined anti-overdischarge processing (which may be referred to as "low-voltage cut-off" processing) when the charge/discharge operation of the secondary battery 30 resumes, i.e., when the present SOC estimated in the engine startup operation falls below a predetermined SOC level (i.e., a criteria being set for determining the possibility of causing an overdischarge in the secondary battery 30).

Figure 8:
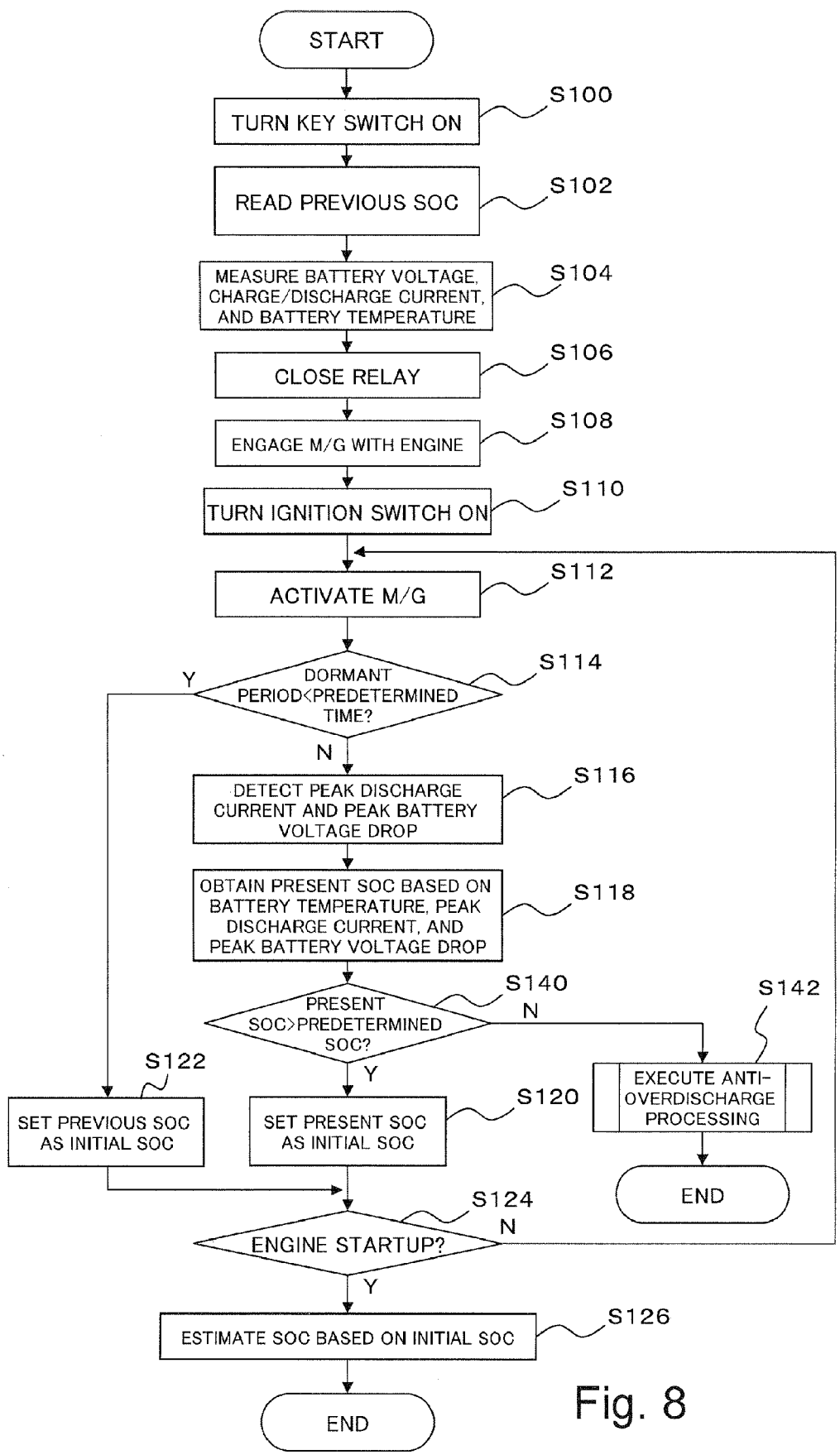
FIG. 8 is a flowchart illustrating a processing procedure for the battery ECU 20 and the HV-ECU 40 in an engine startup operation according to a third modified embodiment.

FIG. 8 is a flowchart illustrating a processing procedure for the battery ECU 20 and the HV-ECU 40 in an engine startup operation according to the third modified embodiment.

As illustrated in FIG. 8, the third modified embodiment includes step S140 of determining whether the present SOC obtained in step S118 is higher than a predetermined SOC. If the present SOC obtained in step S118 is equal to or less than the predetermined SOC (NO in step S140), the processing flow proceeds to step S142. In step S142, the battery ECU 20 executes the anti-overdischarge processing. The anti-overdischarge processing is, for example, carried out before starting an ordinary charge/discharge operation of the secondary battery 30. The anti-overdischarge processing includes limiting the discharge current of the inverter 50 and using electric power of the motor generator 52 exclusively for charging the secondary battery 30 immediately after an engine startup operation.

As described above, the third modified embodiment can promptly start the anti-overdischarge processing immediately after an engine startup operation. Namely, the third modified embodiment can speedily detect a risk of causing an overdischarge immediately after a charge/discharge operation of the secondary battery 30 resumes and suppress or eliminate the overdischarge. The risk of causing an overdischarge is high in such a transient state, compared to an ordinary state where the SOC can be estimated based on the battery voltage Vb, the charge/discharge current I, and the battery temperature T.

The above-described embodiment or each modified embodiment directly sets a present SOC or a previous SOC as an initial SOC. However, the present SOC or the previous SOC is a setting parameter of the initial SOC and therefore, to correct the initial SOC, can be multiplied by a predetermined correction coefficient or can be added to a predetermined correction value.

Furthermore, the above-described embodiment or each modified embodiment uses an average battery voltage (terminal voltage) Vb of the battery block, to express the battery voltage Vo measured before initiating power supply or the lowest battery voltage Vs measured after initiating power supply. However, similar to a method using an average voltage, it is useful to use the entire voltage V of the secondary battery representing a sum of voltages of respective battery blocks.

Furthermore, the battery ECU 20 and the HV-ECU 40 can be realized by a microcomputer that installs a program corresponding to various processing illustrated in FIGS. 5 to 8 and executes the program.

The microcomputer includes a CPU, a communication bus, interfaces, and various memories (e.g., ROM, RAM, and EEPROM). The CPU successively reads and executes a processing program (i.e., firmware) stored in the ROM. The memory stores, beforehand, various data including the predetermined time ta and the map data illustrated in FIG. 4A. The CPU detects a turning-on operation of the ignition switch and measures a dormant period of the secondary battery 30 with a built-in timer that starts a counting operation in response to the turning-on operation of the ignition switch. If a discharge dormant period of the secondary battery 30 is longer than the predetermined time ta, the CPU calculates the peak discharge current Is and the peak battery voltage drop ΔVs based on a battery voltage V and a discharge current I obtained via the interfaces from various sensors and stored in the memory. Subsequently, the CPU identifies a present SOC obtainable from the calculated peak discharge current Is and the peak battery voltage drop ΔVs with reference to the map data corresponding to the battery temperature T. The CPU sets the identified present SOC as an initial SOC and estimates a state of charge of the secondary battery 30 based on the initial SOC as a value effective immediately after initiating power supply to the motor generator 52.

What is claimed is:

1. A battery control apparatus comprising:
   a determination unit configured to determine whether a secondary battery generates a polarization voltage in response to resuming power supply from the secondary battery to a load; and
   a state-of-charge estimating unit configured to estimate a present state of charge indicating a state of charge of the secondary battery immediately after resuming power supply, in response to the determination unit determining that the secondary battery generates no polarization voltage,
   wherein the state-of-charge estimating unit calculates the present state of charge by measuring a battery voltage Vo measured before resuming power supply, a peak discharge current Is representing a maximum current value appearing within a predetermined short period of time after resuming power supply, and a lowest battery voltage Vs corresponding to the peak discharge current Is, and by referring to an SOC estimating map illustrating a relationship between a peak battery voltage drop ΔVs and the peak discharge current Is, wherein the peak battery voltage drop ΔVs represents a difference between the battery voltage Vo and the lowest battery voltage Vs, and
   wherein the state-of-charge estimating unit sets an initial value based on the estimated present state of charge and estimates a state of charge of the secondary battery based on the initial value as a value effective immediately after resuming power supply.

2. The battery control apparatus according to claim 1, wherein the determination unit determines that the secondary battery generates no polarization voltage when a dormant period is longer than a predetermined time and determines that the secondary battery generates a polarization voltage when the dormant period is shorter than or equal to the predetermined time, wherein the dormant period is equivalent to the duration from a previous stop of the power supply to a present resuming of the power supply.

3. The battery control apparatus according to claim 1, wherein the state-of-charge estimating unit sets the initial value based on a previous state of charge estimated immediately before a previous stop of the power supply, in response to the determination unit determining that the secondary battery generates a polarization voltage.

4. The battery control apparatus according to claim 1, further comprising a control unit configured to prevent the state-of-charge estimating unit from estimating the present state of charge and prohibit resuming the power supply, in response to the determination unit determining that the secondary battery generates a polarization voltage.

5. The battery control apparatus according to claim 1, wherein the state-of-charge estimating unit determines whether the present state of charge is higher than a previous state of charge estimated immediately before a previous stop of the power supply, and sets the initial value based on the previous state of charge instead of using the present state of charge.

6. The battery control apparatus according to claim 1, furthermore comprising a control unit configured to execute predetermined anti-overdischarge processing for the secondary battery in response to a determination that the present state of charge is less than a predetermined value.

7. The battery control apparatus according to claim 1, wherein the state-of-charge estimating unit estimates the present state of charge based on a battery temperature of the secondary battery in addition to the peak battery voltage drop $\Delta Vs$ and the peak discharge current Is.

8. A computer-readable medium storing a program for causing a computer to perform processing for estimating a state of charge of a secondary battery, the processing comprising:
   determining whether the secondary battery generates a polarization voltage in response to resuming power supply from the secondary battery to a load;
   estimating a present state of charge indicating a state of charge of the secondary battery immediately after resuming power supply, in response to a determination that the secondary battery generates no polarization voltage, by measuring a battery voltage Vo measured before resuming power supply, a peak discharge current Is representing a maximum current value appearing within a predetermined short period of time after resuming power supply, and a lowest battery voltage Vs corresponding to the peak discharge current Is, and by referring to an SOC estimating map illustrating a relationship between a peak battery voltage drop $\Delta Vs$ and the peak discharge current Is, wherein the peak battery voltage drop $\Delta Vs$ represents a difference between the battery voltage Vo and the lowest battery voltage Vs;
   setting an initial value based on the estimated present state of charge; and
   estimating a state of charge of the secondary battery based on the initial value as a value effective immediately after resuming power supply.

9. An electric vehicle comprising:
   a motor generator configured to generate a driving power;
   a secondary battery configured to supply electric power to the motor generator;
   a determination unit configured to determine whether a dormant period is longer than a predetermined time when the secondary battery resumes power supply to the motor generator in response to a turning-on operation of an ignition switch, wherein the dormant period is equivalent to the duration from a previous stop of the power supply to a present resuming of the power supply; and
   a state-of-charge estimating unit configured to estimate a present state of charge indicating a state of charge of the secondary battery immediately after resuming power supply, in response to a determination by the determination unit that the dormant period is longer than a predetermined time,
   wherein the state-of-charge estimating unit calculates the present state of charge by measuring a battery voltage drop Vo measured before resuming power supply, a peak discharge current Is representing a maximum current value appearing within a predetermined short period of time after resuming power supply, and a lowest battery voltage Vs corresponding to the peak discharge current Is, and by referring to an SOC estimating map illustrating a relationship between a peak battery voltage drop $\Delta Vs$ and the peak discharge current Is, wherein the peak battery voltage drop $\Delta Vs$ represents a difference between the battery voltage Vo and the lowest battery voltage Vs, and
   wherein the state-of-charge estimating unit sets an initial value based on the estimated present state of charge and estimates a state of charge of the secondary battery based on the initial value as a value effective immediately after resuming power supply.

* * * * *

UNITED STATES PATENT AND TRADEMARK OFFICE
CERTIFICATE OF CORRECTION

PATENT NO. : 7,893,652 B2  
APPLICATION NO. : 11/849215  
DATED : February 22, 2011  
INVENTOR(S) : M. Suzuki et al.

Page 1 of 1

It is certified that error appears in the above-identified patent and that said Letters Patent is hereby corrected as shown below:

| COLUMN | LINE | ERROR |
|---|---|---|
| 14 (Claim 9, | 36 line 21) | "drop Vo measured" should read --Vo measured-- |

Signed and Sealed this
Eighth Day of November, 2011

David J. Kappos
*Director of the United States Patent and Trademark Office*